US011949294B2

(12) United States Patent
Sirbasku et al.

(10) Patent No.: US 11,949,294 B2
(45) Date of Patent: Apr. 2, 2024

(54) RESISTOR PLATE ASSEMBLY WITH CONTACT BANDS

(71) Applicant: Hamilton Sundstrand Corporation, Charlotte, NC (US)

(72) Inventors: Kyle S. Sirbasku, Rockford, IL (US); Dhaval Patel, Schaumburg, IL (US); Andrew R. Wilkinson, Cherry Valley, IL (US); Mary Christelle Ann Calacal, Rockford, IL (US); Yaser J. Isa, Cherry Valley, IL (US); Edward C. Allen, Davis, IL (US); Duane C. Johnson, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/200,824

(22) Filed: Mar. 13, 2021

(65) Prior Publication Data
US 2022/0294316 A1     Sep. 15, 2022

(51) Int. Cl.
*H02K 11/042* (2016.01)
*H02K 19/36* (2006.01)

(52) U.S. Cl.
CPC .......... *H02K 11/042* (2013.01); *H02K 19/36* (2013.01)

(58) Field of Classification Search
CPC .............................. H02K 11/042; H01C 10/34
See application file for complete search history.

(56) References Cited

U.S. PATENT DOCUMENTS

| 4,492,887 A | 1/1985 | Baldwin |
| 5,219,617 A | 6/1993 | Howard |
| 5,451,731 A | 9/1995 | Yoshizumi |
| 10,460,861 B1 * | 10/2019 | Patel .................. H02K 19/36 |
| 10,879,772 B2 | 12/2020 | Patel et al. |
| 2008/0218035 A1 | 9/2008 | Naghshineh |
| 2013/0300231 A1 * | 11/2013 | Grosskopf ............ H01C 13/02 310/71 |
| 2014/0226383 A1 * | 8/2014 | Brust ................... H02M 7/06 363/126 |
| 2015/0131233 A1 | 5/2015 | Kawauchi |

(Continued)

FOREIGN PATENT DOCUMENTS

| EP | 2773031 A2 | 9/2014 |
| EP | 3758201 A1 | 12/2020 |
| GB | 2473535 A | 3/2011 |

OTHER PUBLICATIONS

Wikipedia: Beryllium Copper.*
Extended European Search Report Issued in Application No. 22161401.9 dated Aug. 31, 2022.

*Primary Examiner* — Ramon M Barrera
(74) *Attorney, Agent, or Firm* — Locke Lord LLP; Joshua L. Jones; Gabrielle Gelozin

(57) ABSTRACT

An assembly comprises a resistor plate for a rotating rectifier assembly (RRA). A shaft bore is defined through the resistor plate for passage of a shaft of an electrical machine, and the resistor plate defines a main annular body around the shaft bore. A first protrusion extends radially outward from the main annular body, so that a first pin bore extends through the first protrusion. At least one contact band is seated in a the pin bore of the resistor plate for mounting a direct current (DC) pin to the resistor plate.

11 Claims, 2 Drawing Sheets

(56) References Cited

U.S. PATENT DOCUMENTS

| | | | |
|---|---|---|---|
| 2015/0194863 A1* | 7/2015 | Rittmeyer | H02K 9/19 |
| | | | 310/54 |
| 2016/0226348 A1 | 8/2016 | Rittmeyer | |
| 2018/0316248 A1 | 11/2018 | Patel | |
| 2019/0390783 A1 | 12/2019 | Jedlinski | |
| 2020/0220426 A1 | 7/2020 | Horng | |

* cited by examiner

RESISTOR PLATE ASSEMBLY WITH CONTACT BANDS

BACKGROUND

1. Field

This disclosure relates generally to electrical machines and more particularly to resistor plates for generators.

2. Description of Related Art

In a typical variable frequency generator (VFG), there is a resistor assembly that is mounted in the rotor shaft. The resistor plate assembly can include two resistor pin bores/pin connections and serves two functions in the rotor balance assembly. First, the resistor plate assembly connects the positive direct current (DC) pin from the rotating resistor assembly to the resistor package and subsequently the main field. Second, the resistor plate assembly completes the circuit for the positive and negative rails of the rotating rectifier assembly through the suppression resistor. Traditional resistor plate assemblies are made from beryllium copper (BeCu) which can be a health hazard when machined.

The conventional techniques have been considered satisfactory for their intended purpose. However, there is an ever present need for improved systems and methods for improved electrical and thermal conductivity within in a generator. This disclosure provides a solution for this need.

SUMMARY

An assembly comprises a resistor plate for a rotating rectifier assembly (RRA). A shaft bore is defined through the resistor plate for passage of a shaft of an electrical machine, and the resistor plate defines a main annular body around the shaft bore. At least one coolant channel can be defined in the main annular body of the resistor plate. A first protrusion extends radially outward from the main annular body, so that a first pin bore extends through the first protrusion. At least one contact band is seated in a the pin bore of the resistor plate for mounting a direct current (DC) pin to the resistor plate.

A respective joining interface can be formed between each of the at least one contact bands and the resistor plate, and the joining interface can be free of braze. Each respective joining interface of the at least one contact bands can be an interference fit. The at least one contact band can include a first contact band and a second contact band wherein the first contact band is axially stacked with the second contact band within the pin bore. The contact bands can be spring type contact bands. The assembly can further include a DC pin seated in the at least one contact band. The resistor plate can be of Aluminum, the at least one contact band can be of a metallic material, and the assembly can be free of Beryllium Copper (BeCu).

The assembly can further include, a second protrusion extending radially outward from the main annular body, wherein a second pin bore extends through the second protrusion. At least one contact band can be seated in a the second pin bore of the second protrusion, and a second DC pin can be seated in the at least one contact band of the second protrusion.

A resistor cover can be stacked axially with the resistor plate, and a resistor support assembly stacked axially with the resistor plate and the resistor cover, such that the resistor plate can be sandwiched between the resistor cover and the resistor support assembly. The resistor cover and the resistor support assembly can further include at least one axial channel defined therein for accommodating another DC pin.

The resistor plate can be assembled into the RRA of a variable frequency generator (VFG). The first and second DC pins can electrically connect between diodes and a field winding of the VFG for rectifying alternating current (AC) to DC in the RRA. The resistor plate can be the only resistor plate in the VFG.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
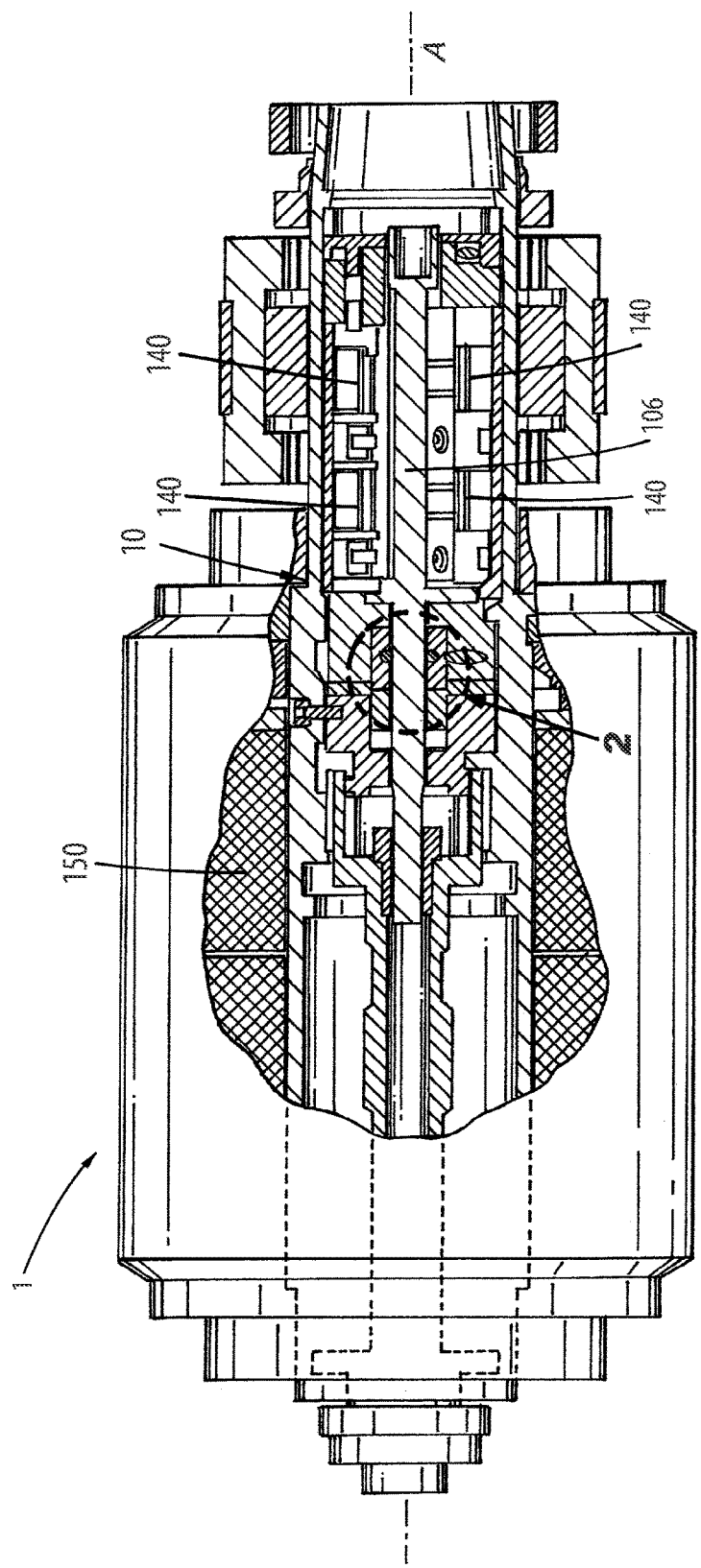
FIG. 1 is a schematic cross-sectional view of an embodiment of an assembly constructed in accordance with the present disclosure, showing a generator having a resistor plate assembly.

Reference will now be made to the drawings wherein like reference numerals identify similar structural features or aspects of the subject disclosure. For purposes of explanation and illustration, and not limitation, a partial view of an embodiment of an assembly in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to improve electrical and thermal conductivity within in a generator.

Figure 2:
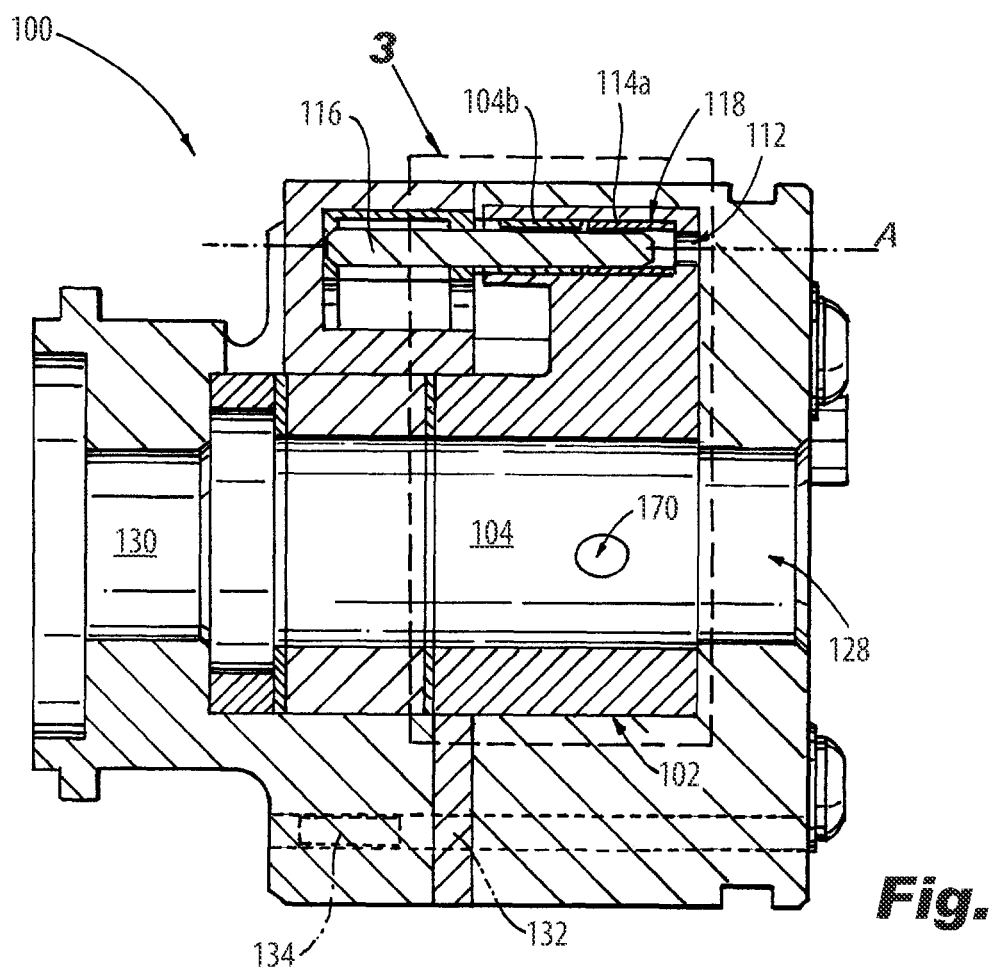
FIG. 2 is a schematic cross-sectional view of the resistor plate assembly if FIG. 1.
Figure 3:
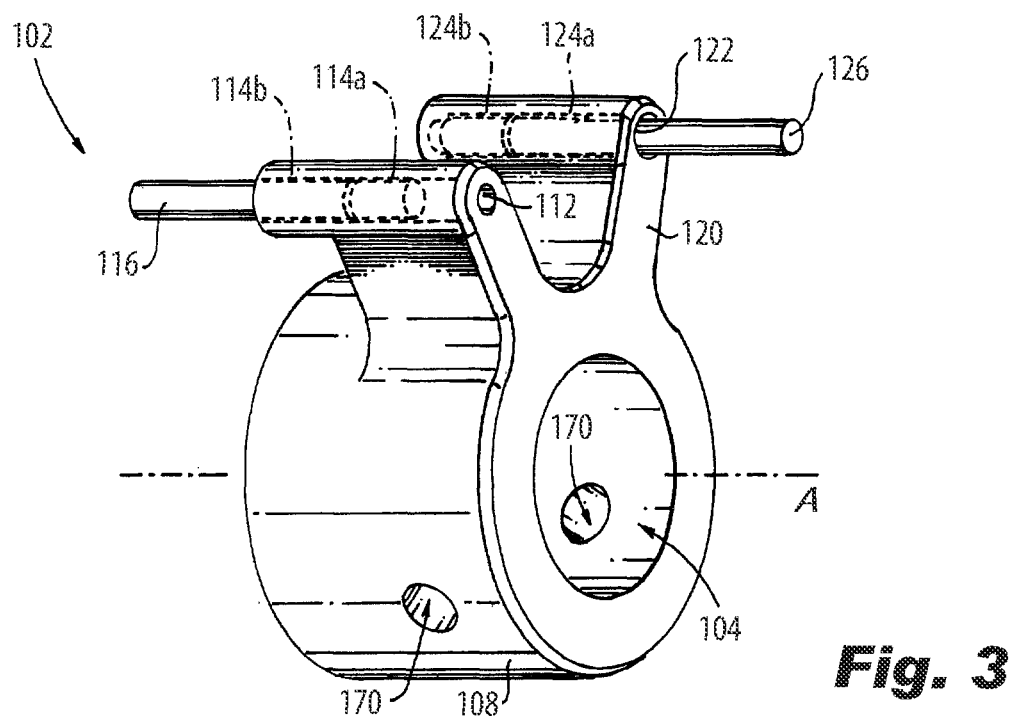
FIG. 3 is a schematic perspective view of an embodiment of the resistor plate of FIG. 2.

Shown in FIGS. 1-3, an assembly 100 can include a resistor plate 102 for a rotating rectifier assembly (RRA) 10 which can be mounted in a generator 1 (e.g. a brushless and/or variable frequency generator (VFG)). The resistor plate 102 can be the only resistor plate in the VFG 1. A shaft bore 104 can be defined through the resistor plate 102 for passage of a shaft 106 of an electrical machine (e.g. generator 1), and for passage of cooling oil through the generator 1. The resistor plate 102 can define a main annular body 108 around the shaft bore 104. At least one coolant channel 170 can be defined in the main annular body 108 of the resistor plate 102.

A first protrusion 110 can extend radially outward from the main annular body 108, so that a first pin bore 112 can extend axially through the first protrusion 110 (e.g. along axis A, parallel to the shaft bore 104). In embodiments, the resistor plate 102 can be of Aluminum, however any suitable conductive material can be used.

Referring to FIG. 2, at least one contact band 114 can be seated in a the first pin bore 112 of the resistor plate 102 for mounting a direct current (DC) pin 116 to the mounting ring 102. The at least one contact band 114 can allow for precise, durable positioning of the DC pin 116 within the resistor plate 102. The at least one contact band 114 can be of a metallic material, for example a material that allows the DC pin 116 to electrically connect between diodes 140 and a field winding 150 of the VFG 1 for rectifying alternating current (AC) to DC in the RRA 10 (e.g. as shown in FIG. 1). Both the resistor plate 102 and at least one contact band 114 can be free of BeCu, however it is contemplated that the entire assembly 100 as described herein can be free of BeCu.

Referring back to FIGS. 1 and 3 respective joining interface 118 can be formed between each of the at least one contact bands 114 and the resistor plate 102, Brazing the DC pin 116 to the resistor plate 102 can weaken the assembly 100, therefore the joining interface 118 can be free of braze. Each respective joining interface 118 of the at least one contact band 114 can be an interference fit, for example, the at least one contact band 114 can be spring type contact band. The at least one contact band 114 can include a first contact band 114a and a second contact band 114b. The first contact band 114a can be axially stacked with the second contact band 114b within the pin bore 112.

Shown in FIG. 3, the assembly 100 can further include, a second protrusion 120 extending radially outward from the main annular body 108, wherein a second pin bore 122 extends through the second protrusion 120. At least one contact band 124a,b can be seated in a the second pin bore 122 of the second protrusion 120, and a second DC pin 126 can be seated in the at least one contact band 124 of the second protrusion 120.

A resistor cover 128 can be stacked axially with the resistor plate 102, and a resistor support assembly 130 can be stacked axially with the resistor plate and the resistor cover. As shown in FIG. 2, the resistor plate 102 can be sandwiched between the resistor cover 128 and the resistor support assembly 130. The resistor cover and the resistor support assembly can both have at least one pin bore 132 defined therein for accommodating another DC pin (not shown). The pin bore 132 can also have at least one contact band 134 seated therein, where contact band 134 is the same or substantially similar to contact bands 114 and 124 described above. The at least one pin bore 132 can provide connection points for DC pins connecting from the diodes 140 in a diode package to mate with the resistor assembly 10.

The methods and systems of the present disclosure, as described above and shown in the drawings, provide for reduced manufacturing cost and part complexity, and improved electrical and thermal conductivity of the resistor plate within the VFG. While the apparatus and methods of the subject disclosure have been shown and described, those skilled in the art will readily appreciate that changes and/or modifications may be made thereto without departing from the scope of the subject disclosure.

What is claimed is:

1. An assembly comprising:
   a resistor plate for a rotating rectifier assembly (RRA), the resistor plate including:
   a shaft bore is defined through the resistor plate for passage of a shaft of an electrical machine;
   a main annular body around the shaft bore;
   a first protrusion extending radially outward from the main annular body, wherein a first pin bore extends through the first protrusion;
   a second protrusion extending radially outward from the main annular body, wherein a second pin bore extends through the second protrusion;
   at least one contact band seated in the first pin bore of first protrusion of the resistor plate for mounting a direct current (DC) pin to the resistor plate, wherein a respective joining interface formed between each of the at least one contact band and the resistor plate is free of braze; and
   at least one contact band seated in a the second pin bore of the second protrusion for mounting a direct current (DC) pin to the resistor plate, wherein a respective joining interface formed between each of the at least one contact band and the resistor plate is free of braze;
   a first DC pin seated in the at least one contact band of the first protrusion; and
   a second DC pin seated in the at least one contact band of the second protrusion.

2. The assembly as recited in claim 1, wherein each respective joining interface of the at least one contact bands is an interference fit.

3. The assembly as recited in claim 1, wherein the at least one contact band includes a first contact band and a second contact band wherein the first contact band is axially stacked with the second contact band within the pin bore.

4. The assembly as recited in claim 1, wherein the resistor plate is of Aluminum.

5. The assembly as recited in claim 1, wherein the at least one contact band is of a metallic material.

6. The assembly as recited in claim 1, further comprising at least one coolant channel defined in the main annular body of the resistor plate.

7. The assembly as recited in claim 1, wherein the resistor plate is assembled into the RRA of a variable frequency generator (VFG), wherein the first and second DC pins electrically connect between diodes and a field winding of the VFG for rectifying alternating current (AC) to DC in the RRA.

8. The assembly as recited in claim 7, further comprising a resistor cover stacked axially with the resistor plate.

9. The assembly as recited in claim 8, further comprising a resistor support assembly stacked axially with the resistor plate and the resistor cover, wherein the resistor plate is sandwiched between the resistor cover and the resistor support assembly.

10. The assembly as recited in claim 9, wherein the resistor cover and the resistor support assembly further include at least one pin bore defined therein for accommodating another DC pin.

11. The assembly as recited in claim 7, wherein the contact bands are spring type contact bands.

* * * * *